United States Patent

[11] 3,610,758

| [72] | Inventor | Maoyeh Lu<br>Fullerton, Calif. |
|---|---|---|
| [21] | Appl. No. | 49,456 |
| [22] | Filed | June 24, 1970 |
| [45] | Patented | Oct. 5, 1971 |
| [73] | Assignee | Beckman Instruments, Inc. |

[54] CALCULATOR FOR MONOCHROMATOR DISPERSION
4 Claims, 1 Drawing Fig.

[52] U.S. Cl. ............................................... 356/74,
235/70, 356/100
[51] Int. Cl. ........................................ G01j 3/00,
G06g 3/00
[50] Field of Search ........................................ 356/74,
89–101; 235/70, 71

[56] References Cited
UNITED STATES PATENTS

| 1,746,083 | 2/1930 | Kurtz | 356/100 X |
| 2,669,899 | 2/1954 | Macleish | 356/100 |
| 2,670,648 | 3/1954 | Miller et al. | 356/100 |
| 3,098,408 | 7/1963 | Cary | 356/101 |
| 3,406,900 | 10/1968 | Hunt | 235/70 |
| 3,468,478 | 9/1969 | Dunn, Jr. | 235/70 |
| 3,512,889 | 5/1970 | Liston | 356/94 |

Primary Examiner—Ronald L. Wibert
Assistant Examiner—F.L. Evans
Attorneys—Paul R. Harder and Robert J. Steinmeyer ABSTRACT: There is disclosed apparatus for automatically calculating spectral bandwidth in a monochromator of the type having slit and wavelength drive mechanisms. A stationary scale member is scribed with indicating marks related to slit width. A sliding scale member is driven by the wavelength drive mechanism to slide juxtaposed with respect to the stationary scale member, the sliding scale member having a surface upon which are scribed indicating marks related to dispersion of the monochromator, the scribed marks of the sliding scale being calibrated with respect to the scribed marks of the stationary scale to indicate on the sliding scale the dispersion of the monochromator opposite a given slit width indication on the stationary scale. A moving indicator driven across the scribed surfaces of both scale members by the slit drive mechanism has a reference line to continuously indicate the monochromator slit width on the stationary scale and the corresponding dispersion on the sliding scale as the monochromator spectrum is scanned.

PATENTED OCT 5 1971
3,610,758
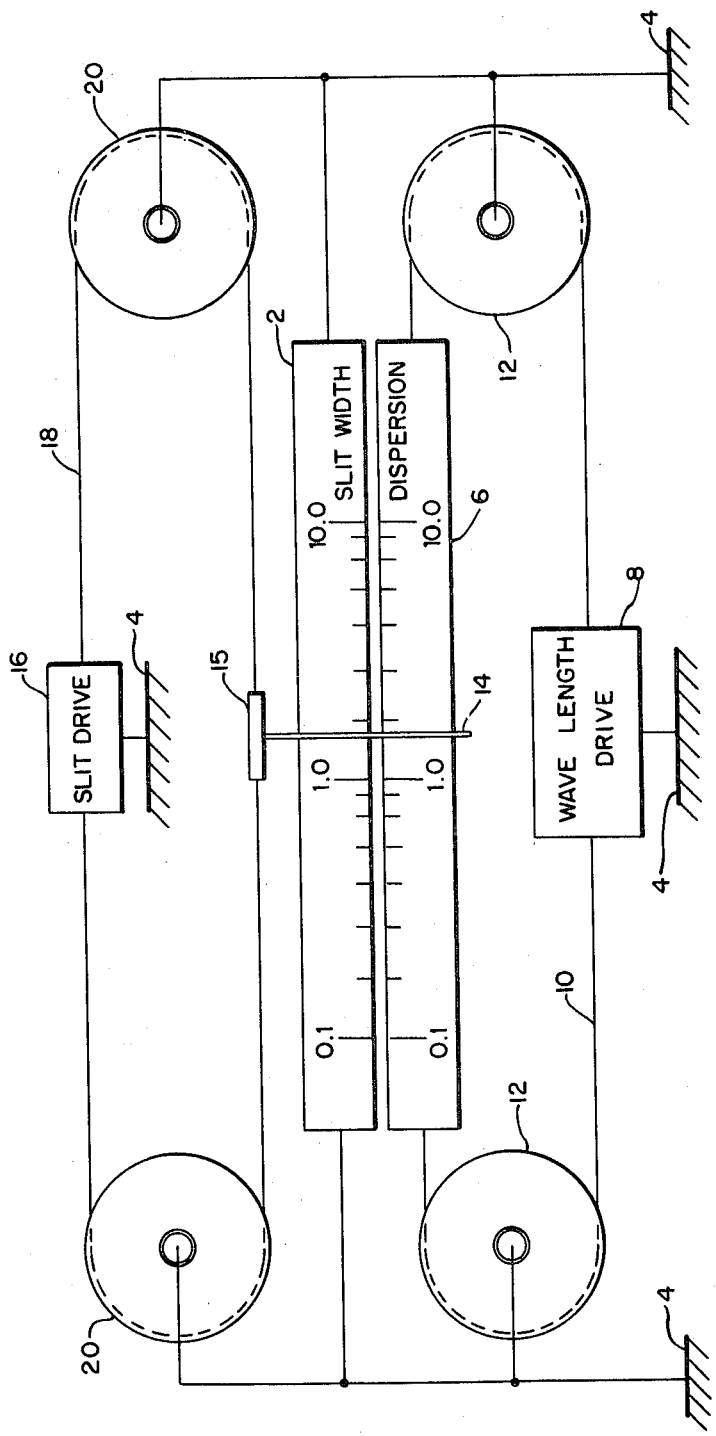
INVENTOR.
MAOYEH LU
BY
ATTORNEY 3,610,758

CALCULATOR FOR MONOCHROMATOR DISPERSION

The present invention relates to monochromators and more particularly to the determination of dispersion or spectral bandwidth of a monochromator at any wavelength by an automatic calculator mechanism.

In the field of spectrophotometry, it has been the general practice to employ manual methods to perform the determination of spectral bandwidth for a given slit width in a monochromator. Although such methods and devices have served the purpose, they have not proved entirely satisfactory under all conditions of service for the reasons that considerable difficulty has been experienced in performing the manual steps of calculation with the resulting human error and difficulties encountered in the excessive time consumed in performing the calculations.

Those concerned with the development of monochromators have long recognized the need for automatically performing the calculation of spectral bandwidth and indicating the results of such a calculation in a continuous manner as the monochromator spectrum is scanned. The present invention fulfills this need.

The general purpose of this invention is to provide an automatic computer of spectral bandwidth in a monochromator which embraces all the advantages of similarly employed manual methods and possesses none of the aforedescribed disadvantages. To attain this, the present invention contemplates a unique slide rule calculator arrangement coupled with the slit width drive mechanism and the wavelength drive mechanism of the monochromator whereby the excessive time consumption and calculating errors of the prior art method and devices are avoided.

An object of the present invention is the provision of apparatus for automatically calculating the spectral bandwidth or dispersion of a monochromator.

Another object is to provide calculating apparatus for automatically indicating dispersion as a function of slit width for a monochromator.

A further object of the invention is the provision of a slide rule mechanism for automatically indicating in a continuous manner the slit width and corresponding dispersion of a monochromator as the spectrum is scanned.

Still another object is to provide scale members and a moving indicator which are moved in a certain manner by the wavelength drive mechanism and the slit width drive mechanism of the monochromator to continuously calculate and indicate the spectral bandwidth of the monochromator as the spectrum is scanned.

Other objects and many of the attendant advantages of this invention will be readily appreciated as the same becomes better understood by reference to the following detailed description when considered in connection with the accompanying drawing which illustrates a mechanical block diagram and schematic of a particular embodiment of the present invention.

Turning now to the drawing, fixed scale member 2 has indicating marks scribed on its surface, which marks may be spaced in a logarithmic manner and assigned values related to the slit widths of the monochromator. One mark may be selected as being the unit slit width and given the designation "1," i.e., 1 millimeter. Fixed scale member 2 is fastened to the body of the monochromator indicated by mechanical mass 4.

Juxtaposed to fixed scale member 2 is sliding scale member 6 which is driven in a certain manner described below by wavelength drive mechanism 8 through cable 10 directed around pulleys 12, which pulleys are attached to mechanical mass 4 for support.

Sliding scale member 6 is scribed with indicating marks having a spacing in direct relation to those marks scribed on scale member 2 and having an assigned value related to the dispersion or spectral bandwidth of the monochromator. Sliding scale member 6 is moved along fixed scale member 2 to indicate on scale member 6 the dispersion of the monochromator opposite the unit slit width designation on fixed scale member 2.

Moving indicator 15 with reference line indicator 14 is positioned over the scribed surfaces of fixed scale member 2 and sliding scale member 6 to provide a line of reference by which the scribed indicating marks on one scale member can be observed with respect to the scribed indicating marks of the other scale member. Moving indicator 15 is driven in a certain manner described below by slit drive mechanism 16 through cable 18 attached around pulleys 20 to moving indicator 15, the pulleys 20 being attached to mechanical mass 4. The motion of indicator 15 is selected to always position indicator 14 over the correct slit width indication on fixed scale member 2.

The apparatus described in the drawing is a slide rule mechanism having two scale members consisting of a fixed scale calibrated in slit width and a moving scale calibrated in dispersion or spectral bandwidth. In the specific embodiment illustrated, the scales are graduated logarithmically to cover the slit width range and the dispersion range for the particular monochromator.

In operation, wavelength drive mechanism 8 moves dispersion scale member 6 with respect to slit width scale member 2 such that opposite a unit slit width scribed indication of, say, 1 millimeter on scale member 2, the dispersion scale of scale member 6 will indicate the correct dispersion per millimeter of slid width of the monochromator.

The moving indicator 15 with reference line 14 is driven by slit drive mechanism 16 in synchronism with the scanning of the spectrum to continuously indicate under reference line 14 the instantaneous slit width and corresponding spectral bandwidth or dispersion of the monochromator during the scan. Therefore, as the monochromator is started into its programmed spectrum scan, sliding scale member 6 moves with respect to fixed scale member 2 and moving indicator 15 moves with respect to both scale members to always maintain under reference line 14 the correct indication of the monochromator slit width and corresponding spectral bandwidth at any given moment during the spectrum scan. This enables the operator of the monochromator to obtain slit width and spectral bandwidth at any point during the scan without time-consuming calculation or possibility of erroneous computation.

It should be clear to one skilled in the art that there are many methods by which the scale members may be calibrated. One suggested method first involves selecting a logarithmic scale having a sufficient number of cycles to cover the numerical range of slit width and dispersion numbers which may be encountered for a given monochromator. Typically, the number of cycles may be three. Next, the physical size of the multicycle log scale is determined to provide the operator with the visual resolution desired. Both scale members are then scribed with the log scale selected, one scale labeled in appropriate slit width dimensions and the other labeled with dimensions of dispersion or bandwidth. The slit width scale member is fixed in position. A mechanical linkage, cam, or gear train is then selected by which the wavelength drive mechanism provides the proper relative motion of the dispersion scale whereby the actual dispersion per unit of slit width of the monochromator is continuously indicated on the dispersion scale opposite that unit of slit width designated on the slit width scale. Lastly, a mechanical linkage, cam, or gear train is selected by which the slit drive mechanism propels the moving indicator to continuously indicate the correct slit width and spectral bandwidth of the monochromator.

It now should be apparent that the present invention provides an automatic slide rule calculator which may be employed in conjunction with a monochromator for continuously indicating slit width and corresponding dispersion or spectral bandwidth during a spectrum scan.

Although particular components and structure have been discussed in connection with a specific embodiment of a calculator constructed in accordance with the teachings of the present invention, others may be utilized. Furthermore, it will be understood that although an exemplary embodiment of the present invention has been disclosed and discussed, other applications and component arrangements are possible and that the embodiments disclosed may be subjected to various changes, modifications and substitutions without necessarily departing from the spirit of the invention.

What is claimed is:

1. Apparatus for calculating spectral bandwidth in a monochromator of the type having a slit drive mechanism and a wavelength drive mechanism, comprising:
   a stationary scale member having a surface upon which are scribed indicating marks related to slit width of the monochromator;
   a sliding scale member driven by the wavelength drive mechanism to slide juxtaposed with respect to said stationary scale member, said sliding scale member having a surface upon which are scribed indicating marks related to dispersion of the monochromator, said scribed marks of said sliding scale being calibrated with respect to said scribed marks of said stationary scale to indicate on said sliding scale the dispersion of the monochromator opposite a given slit width indication on said stationary scale; and
   a moving indicator driven across the scribed surfaces of said scale members by the slit drive mechanism, said indicator having a reference line which moves over the scribe marks of both scale members to continuously indicate the monochromator slit width on said stationary scale and the corresponding dispersion on said sliding scale as the spectrum is scanned.

2. The apparatus defined in claim 1 wherein said scribed indicating marks on said stationary scale are calibrated logarithmically to include the range of the slit widths generated by the monochromator.

3. The apparatus defined in claim 2 wherein said scribed indicating marks on said sliding scale are calibrated logarithmically to indicate dispersion per unit dimension of slit width of the monochromator when said scribe marks of said sliding scale are observed opposite a scribe mark on said stationary scale indicating said unit dimension of slit width.

4. In a monochromator of the type having a slit drive mechanism and a wavelength drive mechanism, and wherein it is desirable to determine dispersion for a given slit width and wavelength, the improvement comprising:
   a slide rule mechanism having one fixed member and one sliding member, said sliding member being moved with respect to said fixed member by the wavelength drive mechanism, said fixed member and said sliding member having scale marks scribed thereon by which dispersion of the monochromator is indicated on said sliding scale opposite the corresponding slit width of the monochromator indicated on said fixed member; and
   a moving indicator placed over said slide rule and driven along said fixed and sliding members by the slit drive mechanism, for indicating on said fixed member the slit width of the monochromator and for indicating on said sliding member the dispersion of the monochromator corresponding to said slit width.